United States Patent
Gunawan et al.

(10) Patent No.: US 10,771,631 B2
(45) Date of Patent: Sep. 8, 2020

(54) STATE-BASED ENDPOINT CONFERENCE INTERACTION

(71) Applicant: DOLBY LABORATORIES LICENSING CORPORATION, San Francisco, CA (US)

(72) Inventors: David Gunawan, Sydney (AU); Glenn N. Dickins, Sydney (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 321 days.

(21) Appl. No.: 15/667,510

(22) Filed: Aug. 2, 2017

(65) Prior Publication Data

US 2018/0041639 A1 Feb. 8, 2018

Related U.S. Application Data

(60) Provisional application No. 62/370,369, filed on Aug. 3, 2016.

(51) Int. Cl.
*H04M 3/56* (2006.01)
*G10L 21/0208* (2013.01)
(Continued)

(52) U.S. Cl.
CPC ............. *H04M 3/569* (2013.01); *G10L 21/02* (2013.01); *G10L 21/0208* (2013.01);
(Continued)

(58) Field of Classification Search
CPC ..... G10L 21/02; G10L 21/0208; G10L 25/78; G10L 2021/02085; G10L 2021/02087;
(Continued)

(56) References Cited

U.S. PATENT DOCUMENTS 6,453,291 B1 * 9/2002 Ashley .................... G10L 25/78
704/200
7,054,820 B2 5/2006 Potekhin
(Continued)

FOREIGN PATENT DOCUMENTS

| EP | 2302891 | 3/2011 |
|---|---|---|
| WO | 2014/143060 | 9/2014 |
| WO | 2015/105764 | 7/2015 |

OTHER PUBLICATIONS

Almajai I. et al., "Using Audio-Visual Features for Robust Voice Activity Detection in Clean and Noisy Speech", 16th European Signal Processing Conference (EUSIPCO 2008), Lausanne, Switzerland, pp. 1-5, Aug. 25-29, 2008.

*Primary Examiner* — Lisa Hashem (57) ABSTRACT

Systems and methods are described for modifying one of far-end signal playback and capture of local audio on an audio device. Frames of both a far-end audio stream and a near-end audio stream may be analyzed using a measure of voice activity, the analyzing producing voice data associated with each frame. Based on the voice data, a conference state may be determined, and one of playback of the far-end audio stream and capture of local audio on an audio device may be modified based on the determined conference state. By associating the likely intent with a predefined state, the device may further cull or remove unwanted or unlikely content from the device input and output. This may have a substantial advantage in allowing for full duplex operation in the case of more meaningful and continuing voice activity, particularly in the case where there are many connected endpoints.

14 Claims, 7 Drawing Sheets

(51) Int. Cl.
*H04L 29/06* (2006.01)
*G10L 21/02* (2013.01)
*G10L 25/78* (2013.01)

(52) U.S. Cl.
CPC ........ *H04L 65/1089* (2013.01); *H04L 65/403* (2013.01); *H04L 65/4038* (2013.01); *H04L 65/604* (2013.01); *G10L 25/78* (2013.01); *G10L 2021/02085* (2013.01); *G10L 2021/02087* (2013.01)

(58) Field of Classification Search
CPC ... H04M 3/568; H04M 3/569; H04L 65/4038; H04L 65/1089; H04L 65/604; H04L 65/403
See application file for complete search history.

(56) References Cited

U.S. PATENT DOCUMENTS

| | | | |
|---|---|---|---|
| 8,199,927 B1 | 6/2012 | Raftery | |
| 8,218,751 B2 | 7/2012 | Hepworth | |
| 8,625,776 B2 * | 1/2014 | Chu | H04M 9/085 379/406.14 |
| 8,767,951 B2 | 7/2014 | Sekine | |
| 8,878,678 B2 | 11/2014 | Liu | |
| 8,947,487 B2 | 2/2015 | Rodman | |
| 9,026,443 B2 | 5/2015 | Lenke | |
| 9,087,521 B2 | 7/2015 | Reynolds | |
| 9,215,543 B2 | 12/2015 | Sun | |
| 9,237,238 B2 | 1/2016 | Chu | |
| 9,373,343 B2 | 6/2016 | Dickins | |
| 10,446,167 B2 * | 10/2019 | Lindahl | G10L 21/0208 |
| 2002/0152066 A1 * | 10/2002 | Piket | G10L 21/0208 704/226 |
| 2005/0213739 A1 | 9/2005 | Rodman | |
| 2013/0294595 A1 * | 11/2013 | Michaud | H04M 3/42382 379/202.01 |
| 2014/0316775 A1 * | 10/2014 | Furuta | G10L 21/0208 704/226 |
| 2015/0011266 A1 | 1/2015 | Feldt | |
| 2015/0058004 A1 | 2/2015 | Dimitriadis | |
| 2016/0014373 A1 * | 1/2016 | LaFata | H04N 7/152 348/14.08 |
| 2017/0078488 A1 * | 3/2017 | Cartwright | G10L 25/78 |
| 2017/0331756 A1 * | 11/2017 | Kummel | H04L 47/54 |
| 2018/0286423 A1 * | 10/2018 | Nakadai | G10L 21/0264 |
| 2018/0295240 A1 * | 10/2018 | Dickins | H04M 3/2281 |

* cited by examiner

STATE-BASED ENDPOINT CONFERENCE INTERACTION

CROSS-REFERENCE TO RELATED APPLICATIONS

This application claims priority from U.S. Provisional Patent application No. 62/370,369 filed Aug. 3, 2016, which is hereby incorporated by reference in its entirety.

TECHNICAL FIELD

Embodiments herein relate generally to audio signal processing, and more specifically to dynamic adjustment of audio playback based on a determined conference state.

SUMMARY OF THE INVENTION

Systems and methods are described for modifying far-end signal playback on an audio device. By monitoring the longer term (e.g., over a frame) voice activity of endpoints and contrasting this with specific voice activity, the audio device may anticipate the likely intent or nature of instantaneous audio traffic. By associating the likely intent with a predefined state, the device may further cull or remove unwanted or unlikely content from the device input and output. This may have a substantial advantage in allowing for full duplex operation in the case of more meaningful and continuing voice activity, particularly in the case where there are many connected endpoints. As used herein, full duplex operation refers to both local capture and far-end audio playback of a device operating substantially at the same time.

The audio device may receive a far-end audio stream, and split the audio stream into a plurality of frames. Each frame may be analyzed using a measure of voice activity to determine if there is voice activity within each frame, the analyzing producing far-end voice data associated with each frame. The far-end voice data may indicate whether the associated frame contains voice activity, e.g., may be an estimate of the voice activity in the frame. For example, each frame may be classified as either containing voice activity ('voice') or not containing voice activity ('not voice'). The far-end voice data may be determined by a voice activity detector, for example. Frames of a local input audio stream may also be analyzed using the measure of voice activity to produce near-end voice data. The near-end voice data may indicate whether the associated frame contains voice activity, e.g., may be an estimate of the voice activity in the frame. For example, each frame may be classified as either containing voice activity ('voice') or not containing voice activity ('not voice'). The near-end voice data may be determined by the voice activity detector, for example. Based on the far-end voice data and the near-end voice data, a conference state may be determined. Based on the determined conference state, playback of the far-end audio stream on a speaker of the audio device or capture of local audio (e.g., on the audio device, for example by a microphone of the audio device) may be modified. The conference state may be indicative of a current presenter in the conference call, e.g., may be indicative of whether the near-end is presenting, the far-end is presenting, or whether the near-end and the far-end are in a two-way conversation. For example, the conference state may be one of a near-end-presentation state, a far-end presentation state, and an intermediate state (e.g., conversation state) between near-end presentation and far-end presentation.

Additional embodiments may include receiving a plurality of far-end audio streams, each stream being from a different endpoint, rather than receiving a single mixed audio signal that includes multiple endpoints. In a further embodiment, each of the plurality of far-end audio streams may be transmitted with an associated data stream, each associated data stream including context information for the corresponding far-end audio stream. In such embodiments, analysis for voice activity may be performed on a per-stream basis. Based on the far-end voice data for each far-end audio stream and near-end voice data, the conference state may be determined. Playback of one or more of the plurality of far-end audio streams or capture of local audio (e.g., on the audio device, for example by a microphone of the audio device) may be modified based on the identified conference state and the received context information.

Further embodiments may analyze each frame of a far-end audio stream using two (different) measures of voice activity to determine if there is voice activity within each frame, the analyzing producing both binary voice data and continuous voice data for each frame. A nuisance state in the far-end audio stream may be determined by, for example, determining a nuisance parameter value for the audio stream that decays over time. The nuisance parameter may be modified based on one or more rules, the binary voice data, and the continuous voice data for the frame. The modified nuisance parameter value may be compared to a threshold, where a nuisance state is identified when the modified nuisance parameter value exceeds the threshold. When a nuisance state is identified, playback of the far-end audio stream on a speaker of the audio device may be modified.

BRIEF DESCRIPTION OF THE FIGURES

This disclosure is illustrated by way of example and not limitation in the figures of the accompanying drawings, in which like references indicate similar elements, and in which.

DETAILED DESCRIPTION

In a conferencing system, there may be many participants simultaneously listening to a call, and each of these over time may want to participate and speak. However, while listening, different endpoints may have a tendency to inject minor noise and nuisance from sources such as typing, headset movements, room noise, coughs and breathing and even minor verbal acknowledgements. When coming from many participants over multiple endpoints, such nuisances may create a substantial amount of audio. In the case of a device operating in speaker mode, or outputting sound into a room, the amount of audio being played out in the room may directly impact the ability to capture audio in that room. This may be particularly true of a small audio conferencing device, where the speakers and microphones are in close proximity.

A typical problem use case with conventional conferencing systems is the experience of 'suck' or brown out, where the audio from a primary speaker or room of interest is momentarily impacted due to a spurious audio burst on the wider conference which has played out the device in that room. For example, room A is presenting material when user B coughs. As the cough is played out in room A, the captured audio from room A is compromised because echo suppression is activated to prevent an echo return path of the cough. All participants at this point may then hear a momentary degradation of the audio from A. In an extreme case where a user is making inadvertent noise, this can render the conference audio poor, requiring a listener to interrupt and resolve the issue as room A can no longer be well understood. This is a common and problematic scenario that takes time and productivity from audio teleconference meetings.

Conventional audio signal processing on conferencing endpoints has traditionally been oblivious to the rest of the conference. Audio signal processing on audio devices, such as speaker phones, conventionally performs functions such as suppressing noise, removing echo, and leveling the local signal. The choices of audio processing are generally pre-defined in the system, and potentially remain unchanged for all use of the audio device. The speakers of the audio device may be configured to output the audio present on the broader conference, and the microphone processing may be configured to optimize audio capture. The system generally operates as if at every moment there may be something of interest to capture in the room, and something important is coming in from the far end to playback. Not only is the signal processing configured without considering the wider state of the conference, the near-end audio signal processing has no real sense of state and time. This is somewhat limiting and suboptimal, given that so much of a conference and human interaction is longer-term state based, and there is a natural progression of speaking cadence and interaction.

The systems and methods described herein use the state of conference interactions to improve the audio processing of audio devices during conference calls. By intelligently analyzing the whole state of the conference and the interactions with a particular endpoint, there is the potential for signal processing that shifts set points (i.e. adjust capture of local audio) based on a conference optimization strategy. Shifting set points refers to the algorithmic parameters which affect how sensitive the algorithms are to microphone sensitivity, VAD and playback level. E.g. For playback level, maybe the output level is attenuated in a particular mode—relative to normal operation. The shifting set points may include one or more of changing microphone sensitivity, changing voice activity detection sensitivity, and changing loudspeaker playback level based on the conference state.

Figure 1:
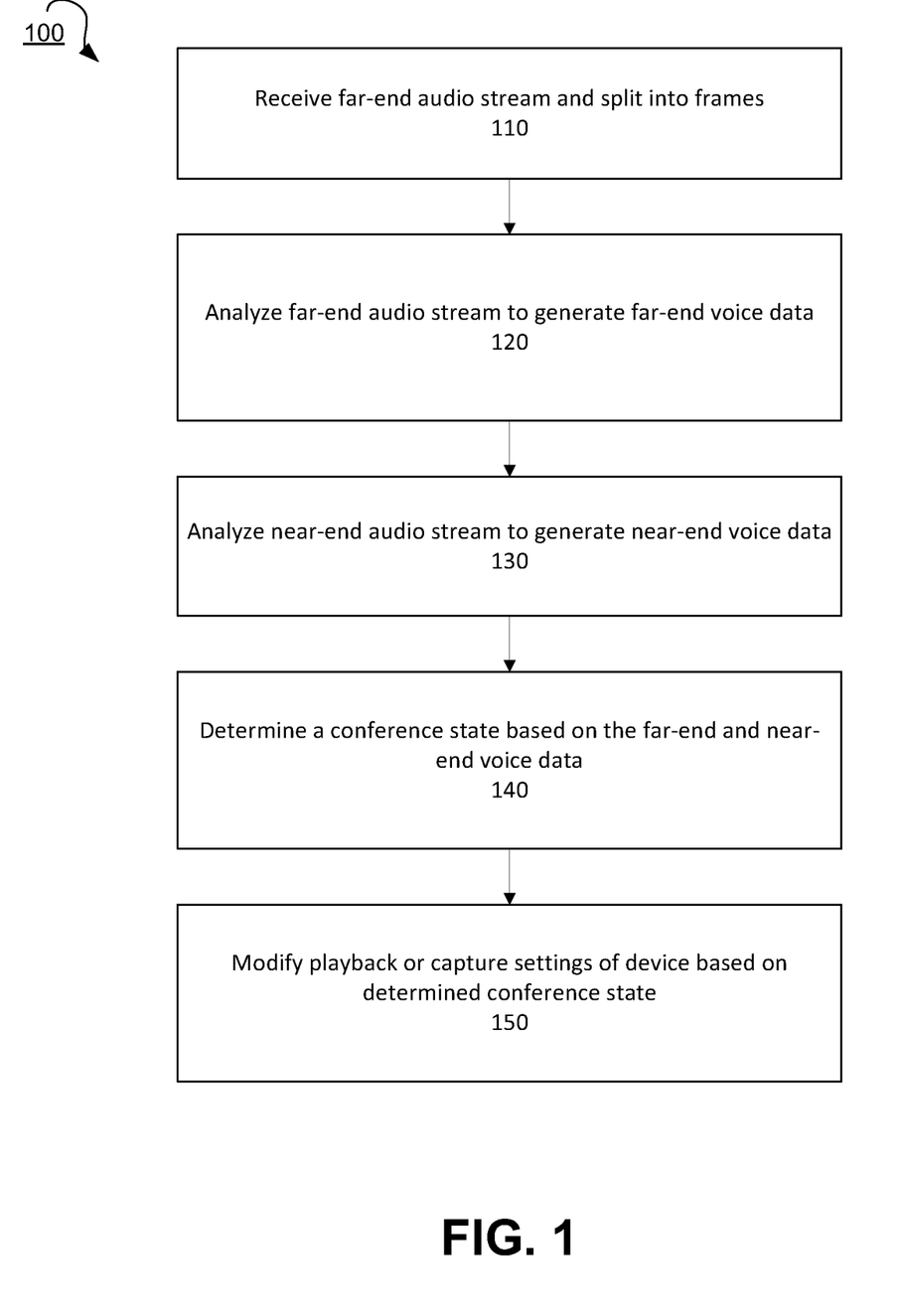
FIG. 1 shows a flow diagram for a method for modifying far-end signal playback on an audio device, in an embodiment.
Figure 2:
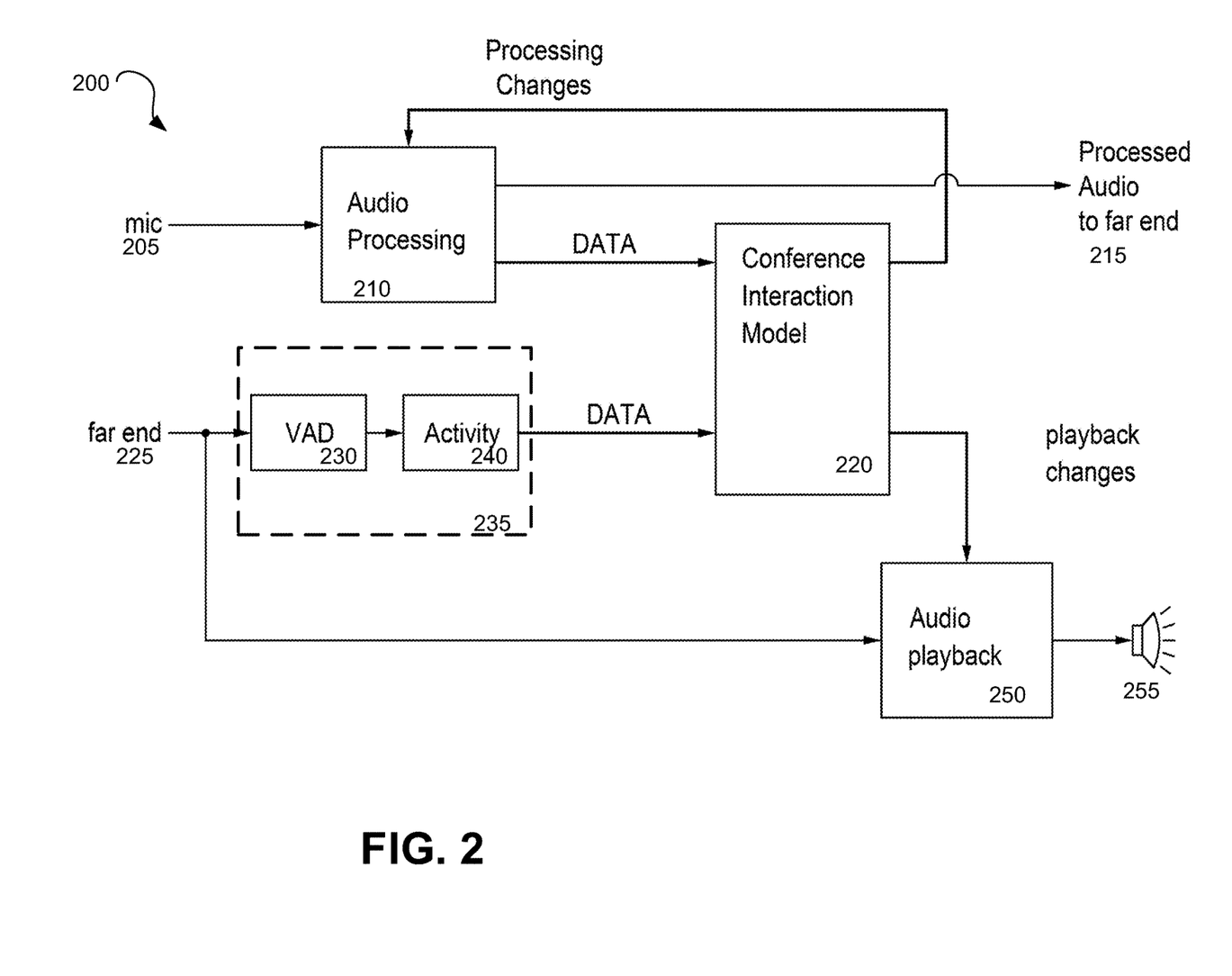
FIG. 2 shows a simplified block diagram of a system for modifying far-end signal playback on an audio device, in an embodiment.

FIG. 1 shows a flow diagram for a method 100 for modifying far-end signal playback on an audio device, in an embodiment. FIG. 2 shows a simplified block diagram of a system 200 for modifying far-end signal playback on an audio device, in an embodiment, which may utilize method 100. The exemplary system 200 for modifying far-end signal playback includes conference interaction model (CIM) 220, near-end audio processing module 210, far-end audio processing module 235, and audio playback module 250. Far-end audio processing module 235 may include voice activity detector (VAD) 230 and voice activity module 240.

A CIM, such as CIM 220, may be defined as a conference state classifier that infers the type of interaction based on the voice activity patterns of the set of P endpoints. As described in greater detail below, by observing the activity of each endpoint in relation to other endpoints, it is possible to determine the type of conference is taking place (e.g. presentation, Q & A, discussion . . . etc). The conference state could be determined using various heuristics or machine learning of the activity inputs. Once the state of a conference is known and identified, this information can be relayed to an endpoint or all the endpoints to be used to affect the processing of the signals at each endpoint. This could affect everything from the loudspeaker playback level, or the amount of noise suppression, or the threshold of VAD, or the amount of leveling applied to the near-end microphone of the audio device. In particular embodiments, described below in the discussion of FIGS. 3-4, each endpoint may be capable of calculating the incoming voice activity, and this information can be sent to a server or another endpoint to generate the CIM 220.

In method 100, the audio device may receive a far-end audio stream 225, and split the audio stream 225 into a plurality of frames at step 110. The far-end audio stream 225 may be from a single endpoint, or may be a mixed stream including inputs from multiple endpoints. The device may be any audio device having a speaker, such as a mobile telephonic device having a speaker phone function, or a dedicated speaker phone. The device may include the exemplary system 200 for modifying far-end signal playback on an audio device, for example.

Each frame may be analyzed using a measure of voice activity to determine if there is voice activity within each frame at step 120. The analyzing may produce voice data associated with each frame. For example, consider a conference containing P participant endpoints. Each endpoint may be physically located in a different environment, and may be in communication with the other endpoints via an audio device (e.g., a conference phone with loudspeakers). At step 130, a near-end audio stream may be analyzed to generate near-end voice data. Each conference phone may include an audio processor, such as audio processing module 210, configured to remove echo, adjust levels, and/or remove noise from the near-end recorded audio stream. The processing performed by audio processing module 210 may be performed before the voice activity analysis of step 130 is performed on the near-end voice data in some embodiments.

If the far-end audio stream 225 from endpoint p is segmented into frames f, voice activity within the far-end audio stream $VAD_p[f]$ may be determined, where each frame f is classified as either 'voice' or 'not voice' (binary 1 or 0 respectively) using a Voice Activity Detector (VAD) (e.g., VAD 230 in FIG. 2). Each endpoint may, in an embodiment, calculate both the voice activity of the near-end audio stream (from the microphone/s 205 of the audio device), and additionally calculates the voice activity of the far-end audio stream 225 (which is being played through the speakers 255). This may result in voice data, in the form of voice activity estimates from both the near end, $VAD_{near}[f]$, and far end, $VAD_{far}[f]$, where, in the embodiment, f denotes frames calculated every 20 ms. Any suitable frame size may be utilized; 20 ms frames are just an example. System 200 for modifying far-end signal playback may assume that the far end audio stream 225 is already mixed, and may have little information around who or how many participants are generating the present audio.

The voice activity $VAD_{far}[f]$ in the far-end audio stream 225 can be then further temporally processed (e.g., using a heuristic) to provide an improved voice activity estimate depending on how much latency can be tolerated. For example, a heuristic may be applied by activity module 240 to the voice activity data produced by VAD 230 to remove short bursts—such that only after 500 ms of voice activity is the processed voice activity value for the frame V[f]=1. Additionally, a 'hold over' may be applied to keep V[f]=1 for an additional 1 sec when the VAD 230 outputs a value of 1 for a frame. Similar processing may also be applied to the near-end audio stream. When applied to both the near-end and far-end audio streams, the processing may result in filtered voice activity estimates of the near and far end on a particular device $V_{near}[f]$ and $V_{far}[f]$ respectively. Note that embodiments may vary around the tunings of time for the burst rejection and talking hold over. For example, the heuristic may reject bursts of detected sound when the sound is less than a selected value in the range of 200-2000 ms, and further heuristics may add hold over times selected from the range of 500 ms-2000 ms in various embodiments.

The voice activity data V[f] may then fed into a Conference Interaction Model (CIM) 220, which attempts to estimate the type of interaction taking place. Based on the received far-end and near-end voice data, a conference state may be determined at step 140 by the CIM. In an exemplary embodiment, there may be three predefined states: Near end presentation, Far end presentation and Transactional conversation. In further embodiments, the determining the conference state may include calculating a transaction parameter value based on the voice data and the near-end voice data. Based on the calculated transaction parameter value, the conference state may be assigned to the conference call.

The transaction parameter value T may be defined as a low-pass filtered measure of the voice activity at the far end. In an exemplary embodiment, the transaction parameter value is computed using the following expression:

$$T[f]=\max\{0,\min\{1,\alpha T+(1-\alpha)A[f]\}\} \quad (1)$$

In equation (1), $\alpha \in (0,1)$ may be a transaction time constant governing the rate of transaction aggregation, and A[f] may be the voice activity of the far end. A[f] may be calculated using the following expression, in an embodiment:

$$A[f] = \begin{cases} 1, & V_{far}[f]=1 \\ 0, & V_{near}[f]=1 \end{cases} \quad (2)$$

Further, the voice activity of the far end A[f] may be set to zero if both $V_{far}[f]$ and $V_{near}[f]$ are zero; if both $V_{far}[f]$ and $V_{near}[f]$ have values of one, then the voice activity of the far end A[f] may be set to one, since the far-end activity may be dominant. Accordingly, the transaction parameter value is dependent upon both near-end voice activity and far-end voice activity, in the exemplary embodiment. The transaction parameter value T for a far-end audio stream may be a measure of the transactional nature of the conference call, and may range between 0 and 1. When T is close to 1, the far-end is likely presenting, and when T is close to 0, the near end is likely presenting. In between these values exists a state of transaction around 0.5. Fixed thresholds for T can be placed to denote various states, or hysteresis thresholds, which are adjustable based on previous values of T, may be used.

Based on the determined conference state, playback of the far-end audio stream on a speaker of the audio device may be modified at step 150. In some embodiments, capture of the near-end audio stream may be adjusted by near-end audio processor 210 based on the determined conference state, as is shown in FIG. 2 (with respect to processed near-end audio 215). In an exemplary embodiment, if T>=0.9 (indicating a far end presentation), VAD thresholds for the near-end audio stream may be increased (less sensitive), microphone levels may be decreased (attenuated transmission), and noise suppression of the near-end audio stream may be increased by the CIM 220 (providing modified settings to audio processing module 210) to minimize disturbance of spurious noise interrupting the far-end presentation. The CIM 220 may also modify playback of the far-end audio stream through the speakers 255 by providing modified settings to audio playback module 250, causing the far-end audio stream to be played back slightly louder. In one embodiment, it was also found useful to increase the voice detection threshold equivalent to halving the rate of false alarms on a test corpus; to decrease the microphone transmit level on average by 6 dB; and to increase the speaker output by 3-6 dB, or return to the desired volume setpoint of the user during the far-end presentation state.

In a further embodiment, if T=<0.1 (indicating that the near end endpoint is presenting), VAD thresholds for the near-end audio stream can be decreased (to be more sensitive for transmission) by the near-end audio processor 210. The near-end audio processor 210 may also increase microphone levels (e.g., from nominal transmission levels to perhaps 3 dB higher) and decrease noise suppression to maximize the capture of audio from participants at the near-end endpoint. The playback level of the far-end audio stream can also be reduced by CIM 220 (via audio playback module 250) to improve double talk performance and minimize other distractions. In some embodiments, in this case of T=0 or close, the main endpoint may enter a continuous transmission mode, whereby there is no loss of audio due to voice activity detection errors (i.e., the state may be held regardless of VAD changes).

In additional embodiments, when $T \in [0.4, 0.6]$ then the conference is likely in transactional conversation state and processing can proceed in its default mode, without any modification to playback of the far-end audio stream (or capture of the near-end audio stream). In such embodiments, the threshold between the near end presentation state and the transactional conversation state would be a T value of 0.4. Likewise, the threshold between the transactional conversation state and the far-end presentation state would be a T value of 0.6. The threshold values, while defined as 0.4 and 0.6 in the exemplary embodiment, may be set to any desired value. Since the trajectory of T is effected by a low pass or smoothing filter ($\alpha \subset (0.1)$) it is noted that the suggested endpoints of VAD threshold and gain adjustment can be modulated appropriately between the suggested values, in that from T=0.1 . . . 0.4 and also T=0.6 . . . 0.9, the gains may be appropriately scaled in a monotonic and in some embodiments a linear fashion.

Figure 3:
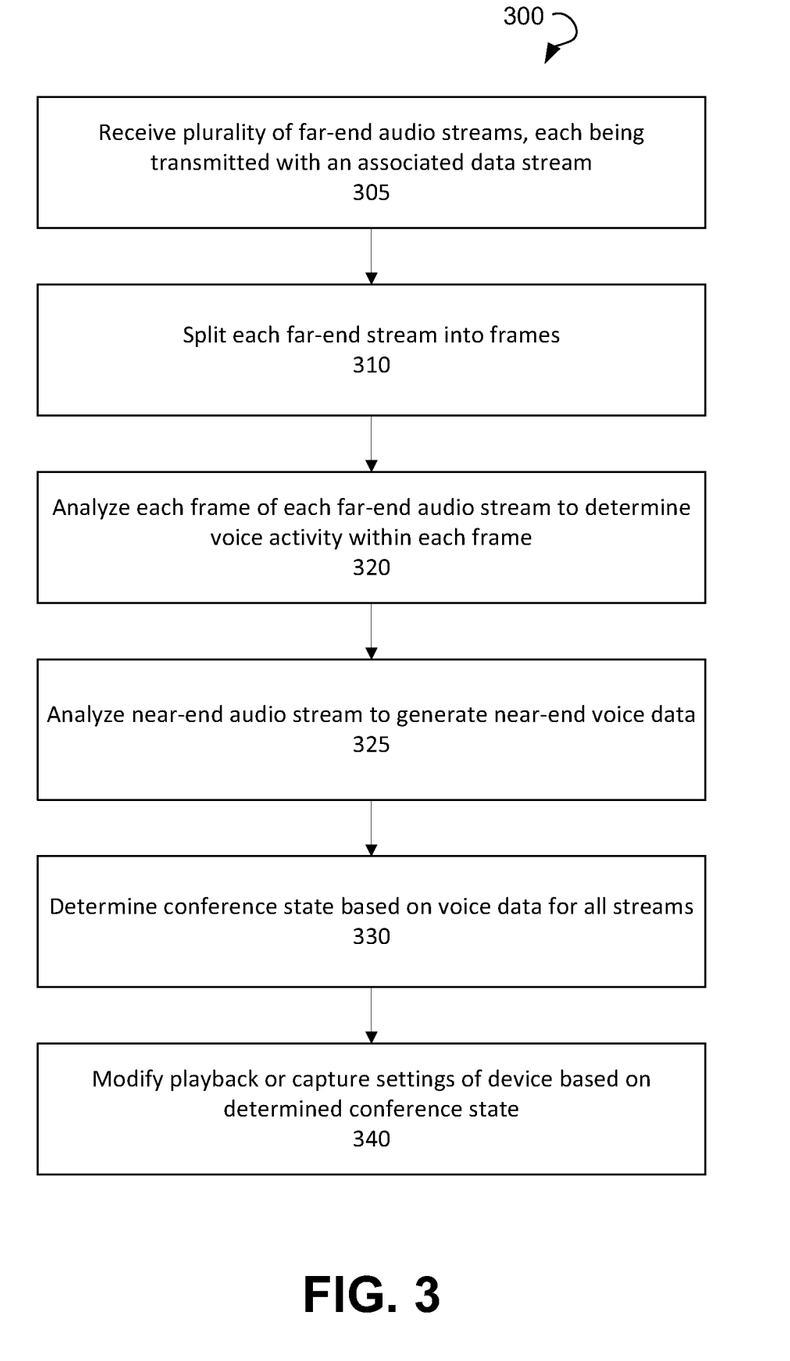
FIG. 3 shows a flow diagram for modifying far-end signal playback on an audio device, in an embodiment.
Figure 4:
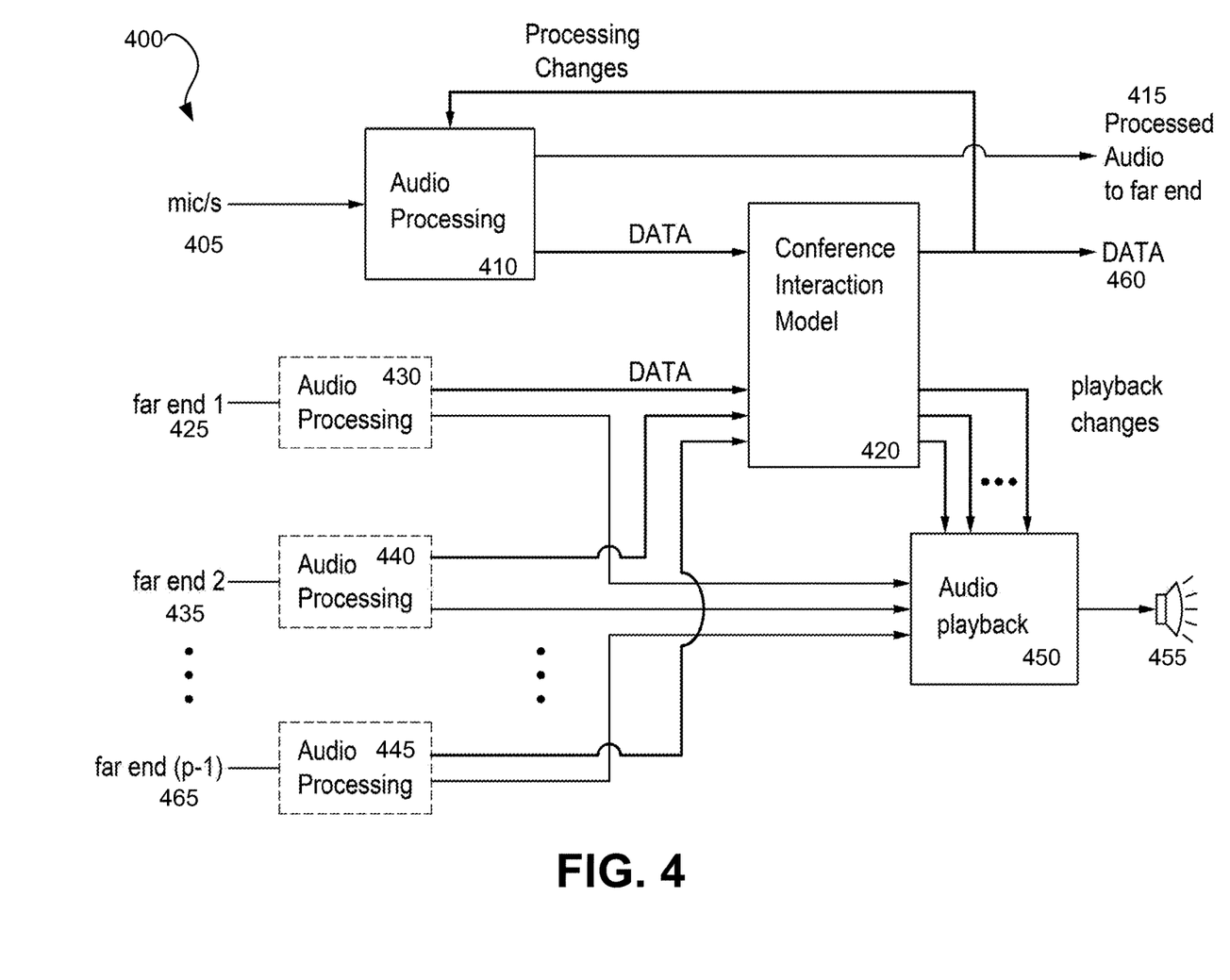
FIG. 4 shows a simplified block diagram of a system for modifying far-end signal playback on an audio device utilizing side-band communication between endpoints, in an embodiment.

As noted above, FIGS. 1-2 pertain to an embodiment where the far end is already mixed, and the audio device has little information around whom or how many participants are generating the far-end audio stream. FIG. 3 shows a flow diagram for an alternative method 300 for modifying far-end signal playback on an audio device, in an embodiment, where there is an additional data channel to send information between endpoints. Such embodiments may be used when audio devices communicate over voice over Internet protocol (VoIP) channels, for example. FIG. 4 shows a simplified block diagram of a system 400 for modifying far-end signal playback on an audio device utilizing side-band communication between endpoints, in an embodiment. The exemplary system 400 may include CIM 420, near-end audio processing module 410, far-end audio processing modules 430, 440, and 445, and audio playback module 450.

In method 300, the audio device may receive a plurality of far-end audio streams (425, 435, etc. up to far end audio stream (P−1) 465) at step 305. Each far-end audio stream may be split into a plurality of frames at step 310, similarly as described above in FIG. 1. Each frame of each far-end audio stream may be analyzed to determine voice activity within each frame at step 320. While the audio processing modules 430, 440, and 445 of the system 400 may be used to determine voice activity (as was done in system 200), in an alternative embodiment, the voice activity data may be received via the additional data channel. Similar to method 100, at step 325 a near-end audio stream may be analyzed to generate near-end voice data.

At step 330, the conference state for each far-end audio stream may be determined based on the voice data for each stream. When there is an additional data channel in which to send information, it is possible to construct a more complex CIM based on specific endpoint VAD information, noise suppression, leveling information and a variety of information captured by the signal processing engines at the various endpoints. Additional information can be captured related to the specifics of the particular device in use, its geography and other system related information. This information can be sent to a conferencing server or to another endpoint where the CIM resides. If a CIM resides in each endpoint, it is possible for each CIM to also communicate with each other so each CIM knows specific state details from the other endpoints, as the state details may be transmitted in the data channel. The CIMs from each audio device can effectively compare notes and sort out differences, as a CIM would have access to audio processing information from every endpoint in the conference. With more information, the CIM can determine even more about the state of the conference.

A presenter may be identified from a plurality of far-end audio streams and modify playback of presenter far-end audio stream in step 340 (e.g., by increasing the volume of the presenter far-end audio stream). In addition to the conference state being calculated, similar measures of the participative nature of each endpoint can be determined by evaluating the processing undertaken. For example, if an endpoint is consistently interrupting with spurious noise incongruent with traditional conversational dynamics models, this endpoint can then be put into a 'nuisance' mode by the CIM, where VAD thresholds are increased, noise suppression is increased and other processing is set to aggressively minimize the potential for conference disturbance. In a further embodiment, if an endpoint is setup in a configuration page to be an 'executive office', then this can potentially weight the importance of contribution to the CIM calculations. VAD can be set to be more sensitive, and microphone level may be increased for near-end audio capture to ensure the presenter is heard. In some cases, the CIM is able to use additional context information, such as the relative locations of endpoints and types of rooms or attendance in each room, the nature of the meeting as scheduled and the roles such as chairperson, additional activity such as document sharing, presenting, typing and video, information around quality of network connection and the likelihood of meaningful transmission, and information around the context of a user such as their movement and location.

Figure 5:
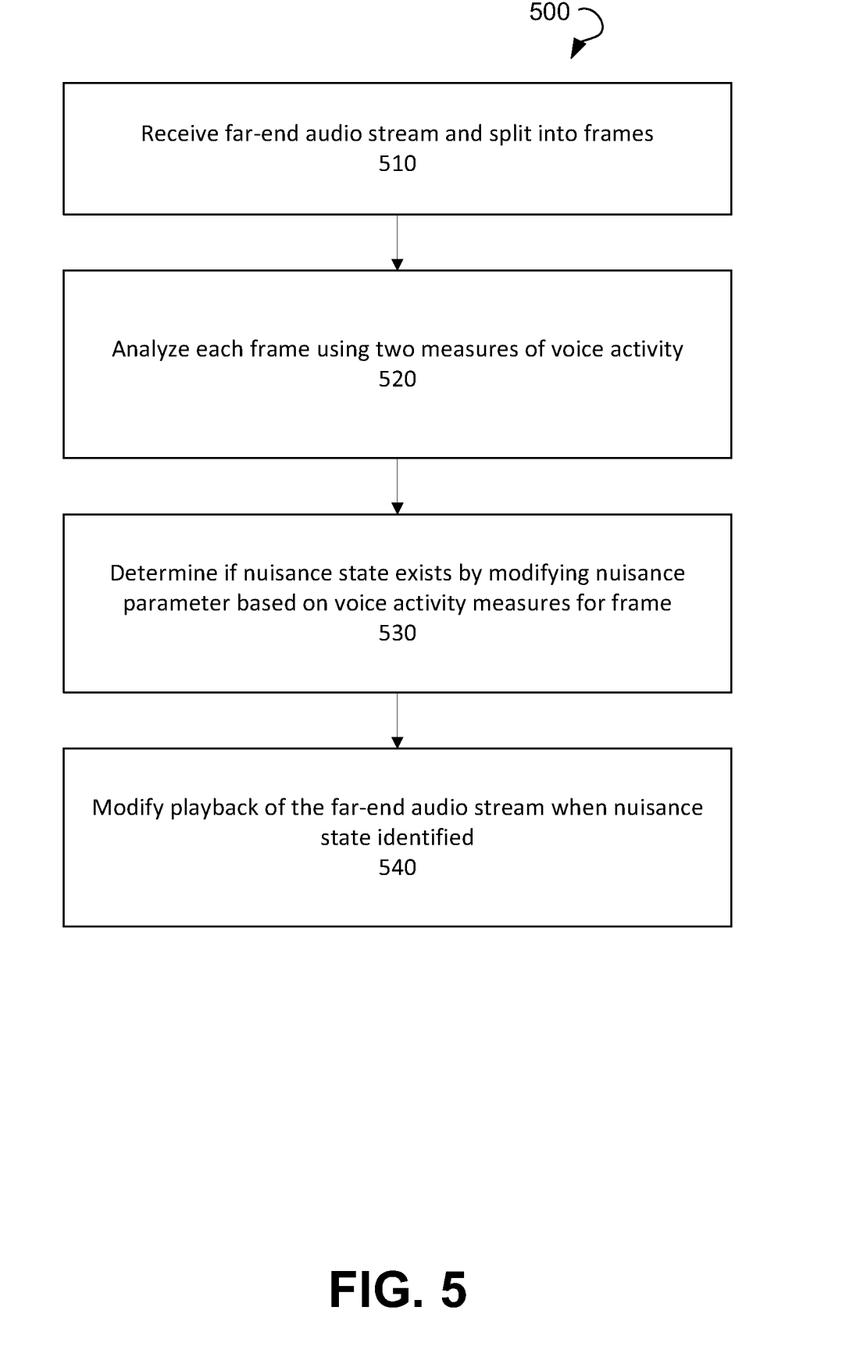
FIG. 5 shows a flow diagram for a method for identifying a nuisance state in an far-end audio stream, in an embodiment.

Other types of modifications may be made to far-end audio streams in accordance with the present invention. FIG. 5 shows a flow diagram for a method 500 for identifying a nuisance state in a far-end audio stream, in an embodiment. In method 500, the audio device may receive a far-end audio stream, and split the audio stream into a plurality of frames at step 510. At step 520, each frame may be analyzed using two measures of voice activity to determine if there is voice activity within each frame. The analyzing may produce both binary voice data and continuous voice data for each frame. $R\_t$ may be defined as the binary measure of audio activity based on a speech activity classifier (such as a VAD, for example). $V\_t$ may be defined as a continuous measure of voice activity based on a higher latency (and more specific) voice classification algorithm. In some embodiments, $R\_t$ may be a simple flag based on receipt of audio if the conference upstream already has sophisticated voice activity detection. $R\_t$ may also be a measure of incoming energy, say for example with a threshold of −40 dB RMS relative to full scale which would remain inactive for the typical incoming background noise signals. In other embodiments, $R\_t$ may include some trained classifiers that are targeted at having a low latency activity detection, where a low latency is deemed to be <100 ms. Such a system, that uses two measures of voice activity, is generally able to adapt and remove sensitivity to energy from stationary or low informational sounds such as background noise, rumble, fans, motors, air conditioning, low level background mumble, car noise and other common constant noise sources. $R\_t$ may have an additional hold over of 200-500 ms to avoid detection of micro-pauses in speech as the end of a frame of voice activity.

In some embodiments, $V\_t$ may be set as an integrated or low pass filtered version of another classifier. $V\_t$ may utilize a larger window of activity, of the order of 500-2000 ms, for example, in order to identify communicative speech as opposed to less relevant noises such as taps, typing, breathing, russling, chair and table noises, coughs and other non-stationary noises. Such non-stationary noise may otherwise trigger the lower latency flag $R\_t$, despite not being informative speech once reviewed over a longer observational window. In one embodiment, $V\_t$ may be implemented as a first order smoothed signal from an instantaneous classifier updated when $R\_t$ is 1. Without loss of generality, $R\_t$ may have a value of either 0 or 1, and $V\_t$ may have a value in the range of 0 to 1 on a continuous scale.

At step 530, a determination is made whether a nuisance state exists within the far-end audio stream. One way of making this determination is by defining a nuisance parameter value for the far-end audio stream. The nuisance parameter may be a measure of the likelihood of an immediate burst of sound being undesirable for the ongoing conference, and therefore more likely to cause a degradation of the room capture than signal a desired interjection or request for far end turn taking. In a nuisance state, the far-end audio stream may be modified by, for example, suppressing the output of the near-end audio device for better results in the duplex performance or local audio capture. The nuisance value may accordingly be connected to a volume reduction of the output.

The nuisance parameter value $N(t)$ may be defined at each instance in time, and may decay over time. The nuisance parameter value may have a natural decay time constant such that with no other condition holding:

$$N(t+1)=\beta N(t) \quad (3)$$

The constant β may be set for a decay half life time constant value selected in a range between 10 and 120 s in an exemplary embodiment (e.g., 60 s in a particular embodiment). That is, for a half life of 10 s and a 50 Hz update rate, β is selected such that β^500=0.5.

Figure 6:
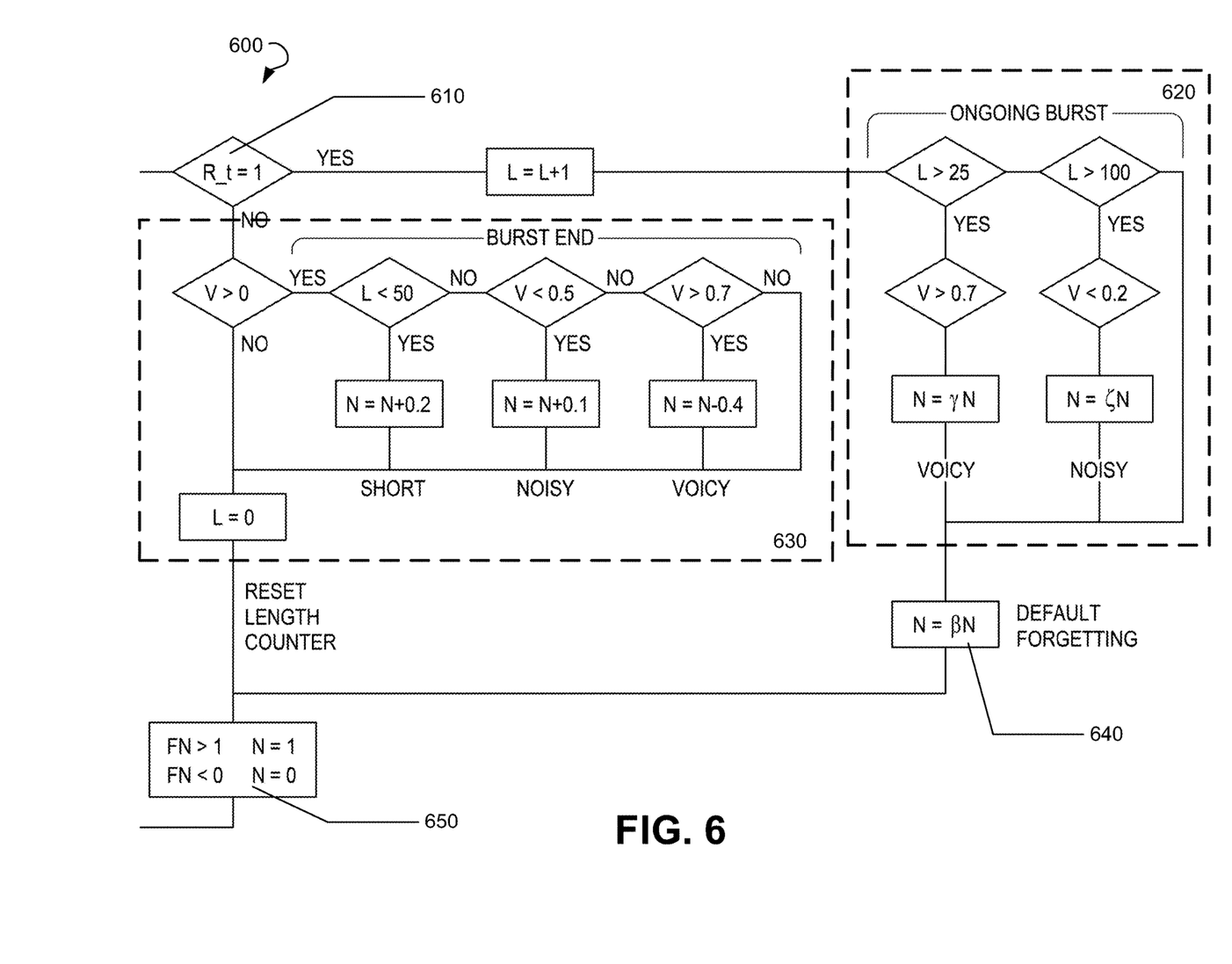
FIG. 6 shows a flow diagram of a plurality of rules for modifying a nuisance parameter value, in an embodiment.

The nuisance parameter N(t) may be modified based on one or more rules, the binary voice data for the frame R_t and the continuous voice data for the frame V_t. FIG. 6 shows a flow diagram 600 of a plurality of rules for modifying a nuisance parameter value, in an embodiment. State machine 600 provides exemplary rules for modifying the nuisance parameter value, without loss of generality for a frame time of 20 ms typical of speech processing.

For example, at the end of a burst of activity, where R_t transitions from 1 to 0, shown at block 610, the length of the activity burst may be considered in logic block 630. If the activity burst is found to be less than a predefined length, the value of N(t) may be further incremented by a constant value:

$$N(t)=N(t)+C\_short \quad (4)$$

In the embodiment shown in FIG. 6, the time threshold for this action was set at 1000 ms, with values in the range from 500 ms to 2000 ms found to meaningfully discriminate between nuisance noise and desired noise. In one embodiment, a value for C_short was set at 0.2, representing 5 activity bursts to set full nuisance level, and values of 0.1 to 0.5 may be used.

Another rule that may be used is also shown in block 630, where, at the end of a burst activity, when the length exceeds the previous test, if the Voice ratio V_t is below a first threshold, the nuisance level may be incremented:

$$N(t)=N(t)+C\_noiseburst \quad (5)$$

In the embodiment shown in FIG. 6, the first threshold for the voice ratio was set at 0.5, but values in the range of 0.2 to 0.7 may be selected. The increment C_noiseburst was set to 0.1 in flow 600, but values in the range of 0.1 to 0.4 may be selected to increment the nuisance parameter value. Similarly, during a burst of activity of duration longer than a given length, whilst R_t=1, if the ratio of voice activity exceeds a second threshold, the nuisance parameter value may be reduced using a faster time constant:

$$N(t)=\gamma N(t) \quad (6)$$

In the embodiment shown in FIG. 6 at block 630, the second threshold of V for this was set at 0.7 (but may be selected from the range 0.6-0.8), and the time constant of 400 ms was found to be useful (but any value from the range 200-1000 ms may be selected). This is to restore nuisance once a concerted effort to communicate is discerned.

During a burst of activity longer than a given length, another rule (shown in block 620) may indicate that if the ratio of voice falls below a certain threshold, the nuisance level may be increased:

$$N(t)=N(t)+C\_noisesustain \quad (7)$$

While equation (7) indicates additive modification of the nuisance level, multiplicative modification of the nuisance may be used in some embodiments. Where C_noisesustain in some embodiment represents a ramp from 0 to 1 over a time of around 5000 ms (e.g. 1/250$^{th}$ of a second increments).

Returning to FIG. 5, when a nuisance state is identified, based on the thresholds described above, for example, playback of the far-end audio stream on a speaker of the audio device may be modified at step 540. In an embodiment, the far-end audio stream may be attenuated by a gain, defined as:

$$G\_t=10^{\wedge}(G\_db/20*N(t)) \quad (8)$$

The attenuation of the far-end audio stream, in dB, may be accordingly scaled linearly with N_t. In one embodiment an attenuation of 10 dB is used; however, any desired attenuation from the range of 3-20 dB may be selected.

While FIG. 5 assumes a mixed far-end signal where there are multiple far-end endpoints, as described above, it is possible to identify the source of multiple audio endpoints uniquely (e.g., using a separate data channel, as shown in FIG. 4). In such cases, a nuisance value could be calculated for each independently identified incoming stream. This is still possible even in the case of a system that combines both mixing and forwarding, or in systems that use peer to peer. If there is the possibility of identifying different source identities, it is useful to have multiple values of nuisance.

When a device only receives audio from far-end endpoints, the device must infer the state of the conference. Where there is additional metadata between clients, however, the nuisance may be calculated locally at the point of transmission, and this could incorporate additional information from the local context. The receiving end may then have a value of nuisance for each incoming audio stream. In both cases above, multiple values of N_t are available, based on the potential end-points. This would improve device performance, as gains for each far-end stream would be received as metadata instead of being calculated as pre-processing at the device. As such, it is presented that the cumulative or present applied attenuation and associated overall N_t may be calculated by, for example, taking instantaneously the minimum nuisance of any currently active incoming audio. This may allow break through for endpoints that were not otherwise causing a nuisance. A further embodiment may include a smoothing filter, such as a low pass filter, with time constant of 100-300 ms in order to avoid sudden jumps in the output level.

Figure 7:
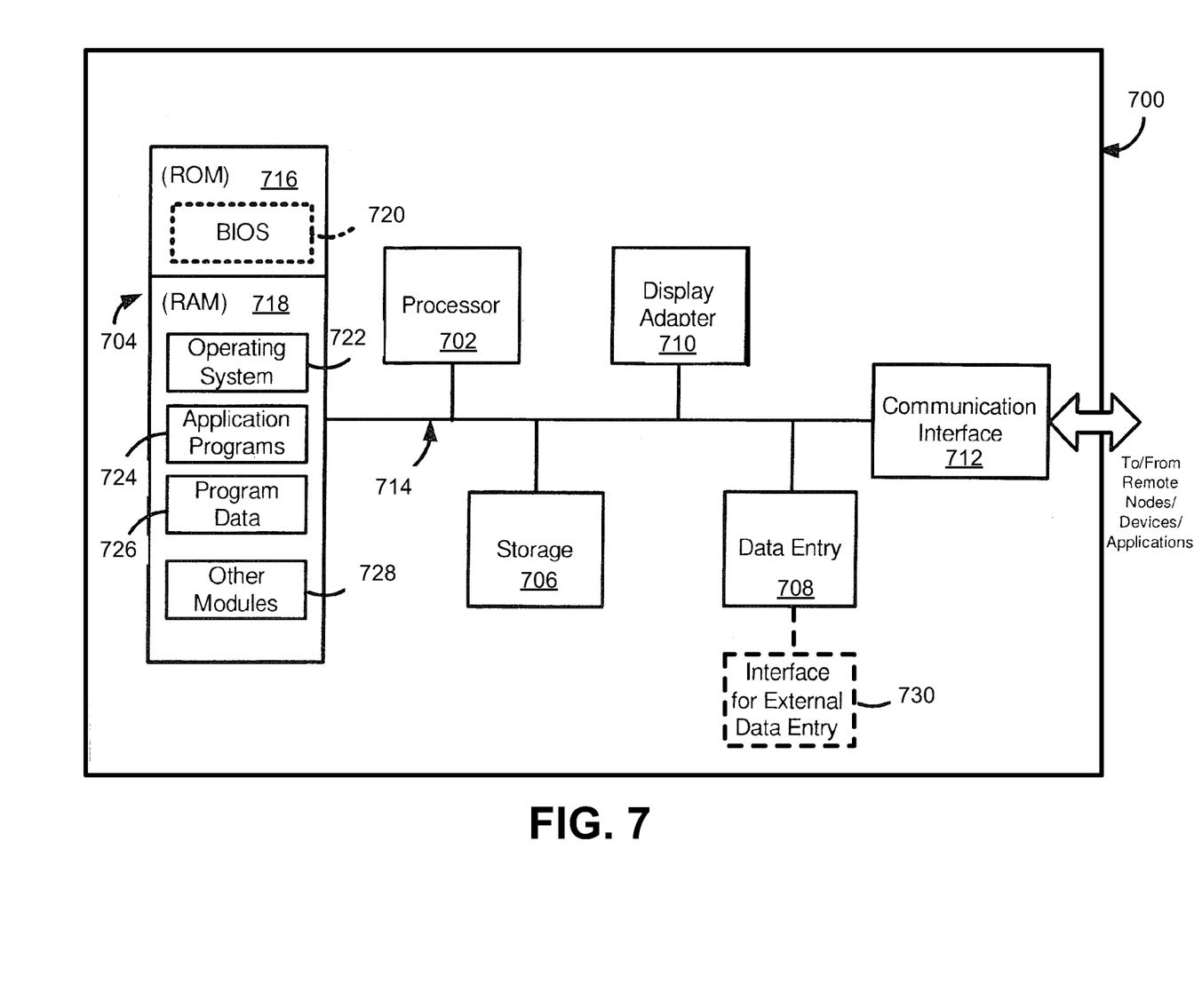
FIG. 7 is a block diagram of an exemplary system for modifying far-end signal playback on an audio device, in an embodiment.

FIG. 7 is a block diagram of an exemplary system for modifying far-end signal playback on an audio device, in various embodiments of the present invention. With reference to FIG. 7, an exemplary system for implementing the subject matter disclosed herein, including the methods described above, includes a hardware device 700, including a processing unit 702, memory 704, storage 706, data entry module 708, display adapter 710, communication interface 712, and a bus 714 that couples elements 704-712 to the processing unit 702.

The bus 714 may comprise any type of bus architecture. Examples include a memory bus, a peripheral bus, a local bus, etc. The processing unit 702 is an instruction execution machine, apparatus, or device and may comprise a microprocessor, a digital signal processor, a graphics processing unit, an application specific integrated circuit (ASIC), a field programmable gate array (FPGA), etc. The processing unit 702 may be configured to execute program instructions stored in memory 704 and/or storage 706 and/or received via data entry module 708.

The memory 704 may include read only memory (ROM) 716 and random access memory (RAM) 718. Memory 704 may be configured to store program instructions and data during operation of device 700. In various embodiments, memory 704 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 704 may also include nonvolatile memory technologies such as nonvolatile flash RAM (NVRAM) or ROM. In some embodiments, it is contemplated that memory 704 may include a combination of technologies such as the foregoing, as well as other technologies not specifically mentioned. When the subject matter is implemented in a computer system, a basic input/output system (BIOS) 720, containing the basic routines that help to transfer information between elements within the computer system, such as during start-up, is stored in ROM 716.

The storage 706 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 700.

It is noted that the methods described herein can be embodied in executable instructions stored in a non-transitory computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 706, ROM 716 or RAM 718, including an operating system 722, one or more applications programs 724, program data 726, and other program modules 728. A user may enter commands and information into the hardware device 700 through data entry module 708. Data entry module 708 may include mechanisms such as a keyboard, a touch screen, a pointing device, etc. Other external input devices (not shown) are connected to the hardware device 700 via external data entry interface 730. By way of example and not limitation, external input devices may include a microphone, joystick, game pad, satellite dish, scanner, or the like. In some embodiments, external input devices may include video or audio input devices such as a video camera, a still camera, etc. Data entry module 708 may be configured to receive input from one or more users of device 700 and to deliver such input to processing unit 702 and/or memory 704 via bus 714.

The hardware device 700 may operate in a networked environment using logical connections to one or more remote nodes (not shown) via communication interface 712. The remote node may be another computer, a server, a router, a peer device or other common network node, and typically includes many or all of the elements described above relative to the hardware device 700. The communication interface 712 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 712 may include logic configured to support direct memory access (DMA) transfers between memory 704 and other devices.

In a networked environment, program modules depicted relative to the hardware device 700, or portions thereof, may be stored in a remote storage device, such as, for example, on a server. It will be appreciated that other hardware and/or software to establish a communications link between the hardware device 700 and other devices may be used.

It should be understood that the arrangement of hardware device 700 illustrated in FIG. 7 is but one possible implementation and that other arrangements are possible. It should also be understood that the various system components (and means) defined by the claims, described above, and illustrated in the various block diagrams represent logical components that are configured to perform the functionality described herein. For example, one or more of these system components (and means) can be realized, in whole or in part, by at least some of the components illustrated in the arrangement of hardware device 700. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 7. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description above, the subject matter may be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

For purposes of the present description, the terms "component," "module," and "process," may be used interchangeably to refer to a processing unit that performs a particular function and that may be implemented through computer program code (software), digital or analog circuitry, computer firmware, or any combination thereof.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

In the description above and throughout, numerous specific details are set forth in order to provide a thorough understanding of the disclosure. It will be evident, however, to one of ordinary skill in the art, that the disclosure may be practiced without these specific details. In other instances, well-known structures and devices are shown in block diagram form to facilitate explanation. The description of the preferred an embodiment is not intended to limit the scope of the claims appended hereto. Further, in the methods disclosed herein, various steps are disclosed illustrating some of the functions of the disclosure. One will appreciate that these steps are merely exemplary and are not meant to be limiting in any way. Other steps and functions may be contemplated without departing from this disclosure.

In an embodiment, a method for modifying one of far-end signal playback and capture of local audio on an audio device during a conference call is disclosed. According to the method, an audio device receives a far-end audio stream. The received far-end audio stream is split into a plurality of frames. Each frame is analyzed using a measure of voice activity to determine if there is voice activity within each frame, the analyzing producing far-end voice data associated with each frame. The far-end voice data may indicate whether the associated frame contains voice activity, e.g., may be an estimate of the voice activity in the frame. For example, each frame may be classified as either containing voice activity ('voice') or not containing voice activity ('not voice'). The far-end voice data may be determined by a voice activity detector, for example. Frames of a local input audio stream are analyzed using the measure of voice activity to produce near-end voice data. The near-end voice data may indicate whether the associated frame contains voice activity, e.g., may be an estimate of the voice activity in the frame. For example, each frame may be classified as either containing voice activity ('voice') or not containing voice activity ('not voice'). The far-end voice data may be determined by a voice activity detector, for example. Based upon the far-end voice data and the near-end voice data, a conference state is determined, and based upon the determined conference state, one of the playback of the far-end audio stream on a speaker of the audio device and capture of local audio (e.g., on the audio device, for example by a microphone of the audio device) are modified. The conference state may be indicative of a current presenter in the conference call, e.g., may be indicative of whether the near-end is presenting, the far-end is presenting, or whether the near-end and the far-end are in a two-way conversation. For example, the conference state may be one of a near-end-presentation state, a far-end presentation state, and an intermediate state (e.g., conversation state) between near-end presentation and far-end presentation.

In an embodiment, the conference state is determined by calculating a transaction parameter value based upon the far-end voice data and the near-end voice data, and based upon the calculated transaction parameter, a conference state is assigned. The transaction parameter may be an estimate of whether the far end or the near end is presenting in the conference call. The transaction parameter may be defined as a low-pass filtered measure of voice activity at the far end, wherein the low-pass filtering is based at least in part on the voice activity at the near end. In an embodiment, predetermined ranges of transaction parameter values are associated with particular conference states. The pre-determined ranges being associated with a near-end presentation state, a far-end presentation state and a conversation state.

In another embodiment, the playback of the far-end audio stream on the speaker of the audio device and/or the capture of local audio is modified by modifying at least one of (1) the voice-activity thresholds for the measure of voice activity, (2) a microphone level of the audio device, and (3) noise suppression of the audio device. For example, if the conference state is the far-end presentation state, the voice activity threshold for the near-end audio stream may be increased, the microphone level of the audio device may be decreased, noise suppression of the near-end audio stream may be increased, and/or a playback level (e.g., speaker volume) of the far-end audio stream may be increased. Any, some, or all of these measures may be performed. On the other hand, if the conference state is the near-end presentation state, the voice activity threshold for the near-end audio stream may be decreased, the microphone level of the audio device may be increased, noise suppression of the near-end audio stream may be decreased, and/or a playback level (e.g., speaker volume) of the far-end audio stream may be decreased. Any, some, or all of these measures may be performed.

In an embodiment, the method can also include the additional step of filtering the voice data to remove short bursts, and/or applying a hold-over on the voice data that indicates presence of voice for a predetermined additional time period after the voice sound has ended in the incoming audio stream.

In another embodiment, a method modifies one of the far-end signal playback on an audio device and capture of local audio (e.g., on the audio device, for example by a microphone of the audio device) during a conference call. An audio device receives a plurality of far-end audio streams, each far-end audio stream being transmitted with an associated data stream, each associated data stream containing context information for the corresponding far-end audio stream. Each far-end audio stream is split into a plurality of frames. Each frame of each far-end audio stream is analyzed using a measure of voice activity to determine if there is voice activity within each frame. The analysis produces far-end voice data associated with each frame of the corresponding far-end audio stream. Frames of a local input audio stream are analyzed using the measure of voice activity to produce near-end voice data. A conference state is determined based on the far-end voice data for each far-end audio stream and the near-end voice data. One of playback of a far-end audio stream of the plurality of far-end audio streams and capture of local audio is modified based on the determined conference state and the context information for the far-end audio stream of the plurality, the playback of the far-end audio stream being performed on a speaker of the audio device.

In an embodiment, the method may further include the step of identifying a far-end audio stream of the plurality of audio streams that is contributing a nuisance, the identifying being based on the voice data associated with the far-end audio stream contributing the nuisance, and modifying playback of the far-end audio stream contributing the nuisance in response to the identifying the far-end audio stream contributing the nuisance.

In an embodiment, a method for modifying one of far-end signal playback and capture of local audio on an audio device during a conference call includes receiving, by an audio device, a far-end audio stream. The received far-end audio stream is split into a plurality of frames. Each frame is analyzed using two measures of voice activity to determine if there is voice activity within each frame, the analyzing producing both binary voice data and continuous voice data for each frame. Then, it is determined whether a nuisance state exists within the far-end audio stream by, for each frame. A nuisance parameter value is defined for the far-end audio stream. The nuisance parameter may decay over time. The nuisance parameter value is modified based on one or more rules, the binary voice data for the frame, and the continuous voice data for the frame. The modified nuisance parameter value is compared to a threshold, wherein a nuisance state is identified for the far-end audio stream when the modified nuisance parameter value exceeds the threshold. When a nuisance state is identified, one of a playback of the far-end audio stream on a speaker of the audio device and capture of local audio is modified.

In an embodiment, the one or more rules of the method includes a rule that the nuisance parameter value is increased when a length of an activity burst indicated by the binary voice data is less than a predetermined threshold.

In another embodiment of the method, the continuous voice data has a value within a range of values corresponding to the level of detected voice activity, and the one or more rules include a rule that the nuisance parameter value is increased when the continuous voice data value falls below a first threshold value within the range of values.

In an embodiment of the method, the continuous voice data has a value within a range of values corresponding to the level of detected voice activity, and the one or more rules includes a rule that the nuisance parameter value is decreased when the continuous voice data value falls above (e.g., rises above) a second threshold value within the range of values.

In another embodiment of the method, the modification of the playback of the incoming audio stream applies a gain to the incoming audio stream, the gain being based on the modified nuisance parameter value.

In an embodiment of this method, there are additional steps. A plurality of incoming audio streams are received wherein each incoming audio stream is transmitted with an associated data stream that includes nuisance parameter values for the corresponding audio stream. Then, one audio stream of the plurality of incoming audio streams is selected which has the lowest nuisance parameter value. The plurality of incoming audio streams are combined into a mixed far-end audio stream; and the playback of the mixed far-end audio stream is modified based only on the lowest nuisance parameter value.

In another embodiment, an audio device is provided that includes as its components (1) a near-end audio processor that receives audio signal data from a microphone, and analyzes frames of the audio signal data using a measure of voice activity to produce near-end voice data; (2) a far-end audio processor that receives an incoming audio stream, splits the audio stream into a plurality of frames, and analyzes each frame using the measure of voice activity to produce far-end voice data; and (3) a conference modeling circuit (as an example of an analysis circuit) coupled to the both the near-end audio processor and the far-end audio processor, the conference modeling circuit determining a conference state based on both the near-end voice data and the far-end voice data, and, based on the determined conference state, modifying one of playback of the incoming audio stream on a speaker and capture of local audio on the audio device.

The invention claimed is:

1. A method for improving audio processing on an audio device during a conference call, the method comprising the steps of:
   receiving, by the audio device, a far-end audio stream;
   splitting the received far-end audio stream into a plurality of frames;
   analyzing each frame using a measure of voice activity to determine if there is voice activity within each frame, the analyzing producing far-end voice data associated with each frame;
   analyzing frames of a local input audio stream using the measure of voice activity to produce near-end voice data;
   determining a conference state based on the far-end voice data and the near-end voice data; and
   based on the determined conference state, modifying at least one of voice-activity thresholds for the measure of voice activity or noise suppression of the audio device.

2. The method of claim 1, the determining the conference state comprising:
   calculating a transaction parameter value based on the far-end voice data and the near-end voice data; and
   based on the calculated transaction parameter value, assigning the conference state to the conference call.

3. The method of claim 2, the calculated transaction parameter value falling within one of a plurality of predetermined ranges, each predetermined range being associated with a conference state.

4. The method of claim 3, a predetermined range being assigned to each of a near-end presentation state, a far-end presentation state, and a conversation state.

5. The method of claim 1, further comprising filtering the voice data to remove short bursts, and/or applying a holdover on the far-end voice data that indicates presence of voice for a predetermined additional time period after voice sound has ended in the far-end audio stream.

6. A method for improving audio processing on an audio device during a conference call, the method comprising the steps of:
receiving, by the audio device, a plurality of far-end audio streams, each far-end audio stream being transmitted with an associated data stream, each associated data stream comprising context information for the corresponding far-end audio stream;
splitting each far-end audio stream into a plurality of frames;
analyzing each frame of each far-end audio stream using a measure of voice activity to determine if there is voice activity within each frame, the analyzing producing far-end voice data associated with each frame of the corresponding far-end audio stream;
analyzing frames of a local input audio stream using the measure of voice activity to produce near-end voice data;
determining a conference state based on the far-end voice data for each far-end audio stream and the near-end voice data; and
modifying at least one of voice-activity thresholds for the measure of voice activity or noise suppression of the audio device based on the determined conference state and the context information for each far-end audio stream of the plurality, playback of the plurality of far-end audio streams being performed on a speaker of the audio device.

7. The method of claim 6, further comprising identifying a far-end audio stream of the plurality of audio streams that is contributing a nuisance, the identifying being based on the voice data associated with the far-end audio stream contributing the nuisance, and modifying playback of the far-end audio stream contributing the nuisance in response to the identifying the far-end audio stream contributing the nuisance.

8. A method for improving audio processing on an audio device during a conference call, the method comprising the steps of:
receiving, by the audio device, a far-end audio stream;
splitting the received far-end audio stream into a plurality of frames;
analyzing each frame using two measures of voice activity to determine if there is voice activity within each frame, the analyzing producing both binary voice data and continuous voice data for each frame;
determining whether a nuisance state exists within the far-end audio stream by, for each frame:
defining a nuisance parameter value for the far-end audio stream that decays over time;
modifying the nuisance parameter value based on one or more rules, the binary voice data for the frame, and the continuous voice data for the frame; and
comparing the modified nuisance parameter value to a threshold, wherein a nuisance state is identified for the far-end audio stream when the modified nuisance parameter value exceeds the threshold; and
when a nuisance state is identified, modifying at least one of a playback of the far-end audio stream on a speaker of the audio device and capture of local audio on the audio device.

9. The method of claim 8, the one or more rules comprising a rule that the nuisance parameter value is increased when a length of an activity burst indicated by the binary voice data is less than a predetermined threshold.

10. The method of claim 8, the continuous voice data having a value within a range of values corresponding to a level of detected voice activity, the one or more rules comprising a rule that the nuisance parameter value is increased when the continuous voice data value falls below a first threshold value within the range of values.

11. The method of claim 8, the continuous voice data having a value within a range of values corresponding to a level of detected voice activity, the one or more rules comprising a rule that the nuisance parameter value is decreased when the continuous voice data value rises above a second threshold value within the range of values.

12. The method of claim 8, comprising the further steps of:
receiving a plurality of incoming audio streams, each incoming audio stream being transmitted with an associated data stream, each associated data stream comprising nuisance parameter values for the corresponding audio stream;
selecting an audio stream of the plurality of incoming audio streams having a lowest nuisance parameter value;
combining the plurality of incoming audio streams into a mixed far-end audio stream; and
modifying playback of the mixed far-end audio stream based only on the lowest nuisance parameter value.

13. An audio device comprising,
a near-end audio processor that receives audio signal data from a microphone, and analyzes frames of the audio signal data using a measure of voice activity to produce near-end voice data;
a far-end audio processor that receives an incoming audio stream, splits the incoming audio stream into a plurality of frames, and analyzes each frame using the measure of voice activity to produce far-end voice data; and
a conference modeling circuit coupled to the both the near-end audio processor and the far-end audio processor, the conference modeling circuit determining a conference state based on both the near-end voice data and the far-end voice data, and, based on the determined conference state, modifying at least one of voice-activity thresholds for the measure of voice activity or noise suppression of the audio device.

14. An audio device comprising,
a far-end audio processor that receives an incoming audio stream, splits the incoming audio stream into a plurality of frames, and analyzes each frame using two measures of voice activity to produce both binary voice data and continuous voice data associated with each frame; and
a conference modeling circuit coupled to the far-end audio processor, the conference modeling circuit:
determining whether a nuisance state exists within the incoming audio stream by, for each frame:
defining a nuisance parameter value for the incoming audio stream that decays over time;

modifying the nuisance parameter value based on one or more rules, the binary voice data for the frame, and the continuous voice data for the frame; and comparing the modified nuisance parameter value to a threshold, wherein a nuisance state is identified for the incoming audio stream when the modified nuisance parameter value exceeds the threshold; and when a nuisance state is identified, modifying at least one of a playback of the incoming audio stream on a speaker of the audio device and capture of local audio on the audio device.

* * * * *